(12) United States Patent
Kanemitsu

(10) Patent No.: US 8,804,169 B2
(45) Date of Patent: Aug. 12, 2014

(54) PRINTING METHOD, IMAGE FORMING APPARATUS, AND WEB SERVER

(75) Inventor: Shigenaka Kanemitsu, Osaka (JP)

(73) Assignee: KYOCERA Document Solutions Inc. (JP)

( * ) Notice: Subject to any disclaimer, the term of this patent is extended or adjusted under 35 U.S.C. 154(b) by 957 days.

(21) Appl. No.: 12/580,528

(22) Filed: Oct. 16, 2009

(65) Prior Publication Data

US 2010/0195143 A1 Aug. 5, 2010

(30) Foreign Application Priority Data

Jan. 30, 2009 (JP) ................................. 2009-020811

(51) Int. Cl.
*G06F 3/12* (2006.01)
*G06K 15/02* (2006.01)

(52) U.S. Cl.
USPC ........................... 358/1.15; 358/1.11; 358/1.1

(58) Field of Classification Search
None
See application file for complete search history.

(56) References Cited

U.S. PATENT DOCUMENTS

| | | | |
|---|---|---|---|
| 5,911,776 A * | 6/1999 | Guck | 709/217 |
| 6,170,007 B1 * | 1/2001 | Venkatraman et al. | 709/218 |
| 6,289,371 B1 * | 9/2001 | Kumpf et al. | 709/203 |
| 6,362,895 B1 * | 3/2002 | Laverty et al. | 358/1.15 |
| 6,614,551 B1 * | 9/2003 | Peek | 358/1.15 |
| 6,744,452 B1 * | 6/2004 | McBrearty et al. | 715/853 |
| 7,512,877 B2 * | 3/2009 | Aoki | 715/234 |
| 2003/0061569 A1 * | 3/2003 | Aoki | 715/517 |
| 2003/0217194 A1 * | 11/2003 | Kazumi et al. | 709/321 |
| 2004/0128280 A1 | 7/2004 | Gomi et al. | |
| 2006/0087682 A1 * | 4/2006 | Lee | 358/1.15 |
| 2008/0222083 A1 | 9/2008 | Lim | |
| 2009/0265760 A1 * | 10/2009 | Zhu et al. | 726/3 |

FOREIGN PATENT DOCUMENTS

| | | |
|---|---|---|
| JP | 11-232365 | 8/1999 |
| JP | 2003-076518 | 3/2003 |
| JP | 2007-140687 | 6/2007 |
| JP | 2008-225468 | 9/2008 |

* cited by examiner

*Primary Examiner* — Marcus T Riley
(74) *Attorney, Agent, or Firm* — McDonnell Boehnen Hulbert & Berghoff LLP

(57) ABSTRACT

A printing method includes a printing program causing: a web server to integrate a plurality of contents with each other to thereby generate a web page, and to transmit the generated web page to a client terminal via a network; the client terminal to transmit a request for printing the web page from a browser screen to the web server; the web server to call a print service of an image forming apparatus in response to the request; the image forming apparatus to transmit to the web server a request for generating a print page corresponding to the web page by the print service; the web server to integrate the plurality of contents with each other to thereby generate the print page and to transmit the generated print page; and the image forming apparatus to receive and to print the print page by the print service.

10 Claims, 8 Drawing Sheets

PRINTING METHOD, IMAGE FORMING APPARATUS, AND WEB SERVER

INCORPORATION BY REFERENCE

This application is based upon and claims the benefit of priority from the corresponding Japanese Patent Application No. 2009-020811, filed Jan. 30, 2009, the entire contents of which are incorporated herein by reference.

BACKGROUND OF THE INVENTION

1. Field of the Invention

The present invention relates to a printing technique in a mashup service.

2. Description of the Related Art

One Internet web service is a mashup service of acquiring contents of information from a plurality of service providers via an API (Application Programming Interface) and utilizing the acquired contents as one part of a mashup.

Up to now, a user had to select web contents of a plurality of different web services, perform operations as to each page, and acquire the contents. By employing a mashup, a user can use the acquired contents as one part of a mashup (mashup contents) obtained by integrating these web contents with each other.

If a user attempts to print mashup contents, the user prints them by employing a browser print function. In this case, the finish quality of printed matters depends upon the browser print function.

Another related art includes a method of a user requesting a web server for printing; the web server determining a print attribute, based upon a requesting user's privacy information; and sequentially printing requested web pages, via a print server.

Another related art includes a method of: downloading an electronic document presuming that a client terminal displays a web page; arranging a print appearance of the electronic document, based upon definition information.

SUMMARY OF THE INVENTION

A printing method, for a printing program executing on a web server, a client terminal and an image forming apparatus, according to an embodiment of the present invention comprises: (1) the printing program causing the web server to acquire contents from a respective one of a plurality of service providers via a network, to integrate a plurality of the acquired contents with each other to thereby generate a web page, and to transmit the generated web page to the client terminal via the network; (2) the printing program causing the client terminal to display the web page and to transmit a request for printing the web page from a browser screen to the web server; (3) the printing program causing the web server to call a print service of the image forming apparatus in response to the request for printing the web page; (4) the printing program causing the image forming apparatus to transmit to the web server a request for generating a print page corresponding to the web page by the print service; (5) the printing program causing the web server to integrate the plurality of contents with each other to thereby generate the print page, in response to the request for generating the print page from the image forming apparatus, and to transmit the generated print page to the image forming apparatus; and (6) the printing program causing the image forming apparatus to receive and to print the print page by the print service.

An image forming apparatus according to an embodiment of the present invention comprises a print service unit, a print page generation requesting unit and a printing device. The print service unit is configured to execute a print service in response to a call from the web server. The print page generation requesting unit is configured to transmit a request for generating a print page of a web page to the web server, in response to an instruction from the print service unit. The printing device is configured to receive and to print from the web server the print page generated by the web server in response to the request for generating the print page from the print page generation requesting unit.

A web server according to an embodiment of the present invention comprises a web page generating unit, a print service calling unit and a print page generating unit. The web page generating unit is configured to acquire contents from a respective one of a plurality of service providers via a network, to integrate a plurality of the acquired contents to thereby generate a web page; and to transmit the generated web page to a client terminal via the network. The print service calling unit is configured to call a print service of the image forming apparatus in response to a print request of the web page from the client terminal. The print page generating unit is configured to integrate the plurality of contents with each other to thereby generate the print page, in response to the request for generating the print page from the image forming apparatus; and to transmit the generated print page to the image forming apparatus.

According to the present invention, a burden upon a client terminal can be reduced with respect to printing a web page generated by a web server.

The foregoing and other features and advantages of an illustrative embodiment of the present invention will be more readily apparent from the following detailed description, which proceeds with references to the accompanying drawings.

DESCRIPTION OF THE EMBODIMENTS

A printing method according to an embodiment of the present invention is used to print a web page browsed via a mashup service.

First, a web server of the mashup service calls a printing service of an image forming apparatus upon receipt of a print request from a client PC. Next, a print page generating unit of the web server generates a print page, and transmits the generated print page to the image forming apparatus, in response to a print page generation request from the image forming apparatus. The image forming apparatus prints the print page received from the web server.

(First Embodiment)

An MFP (Multi Functional Peripheral), which serves as an image forming apparatus according to the embodiment of the present invention, and a web server will be described below.

Figure 3:
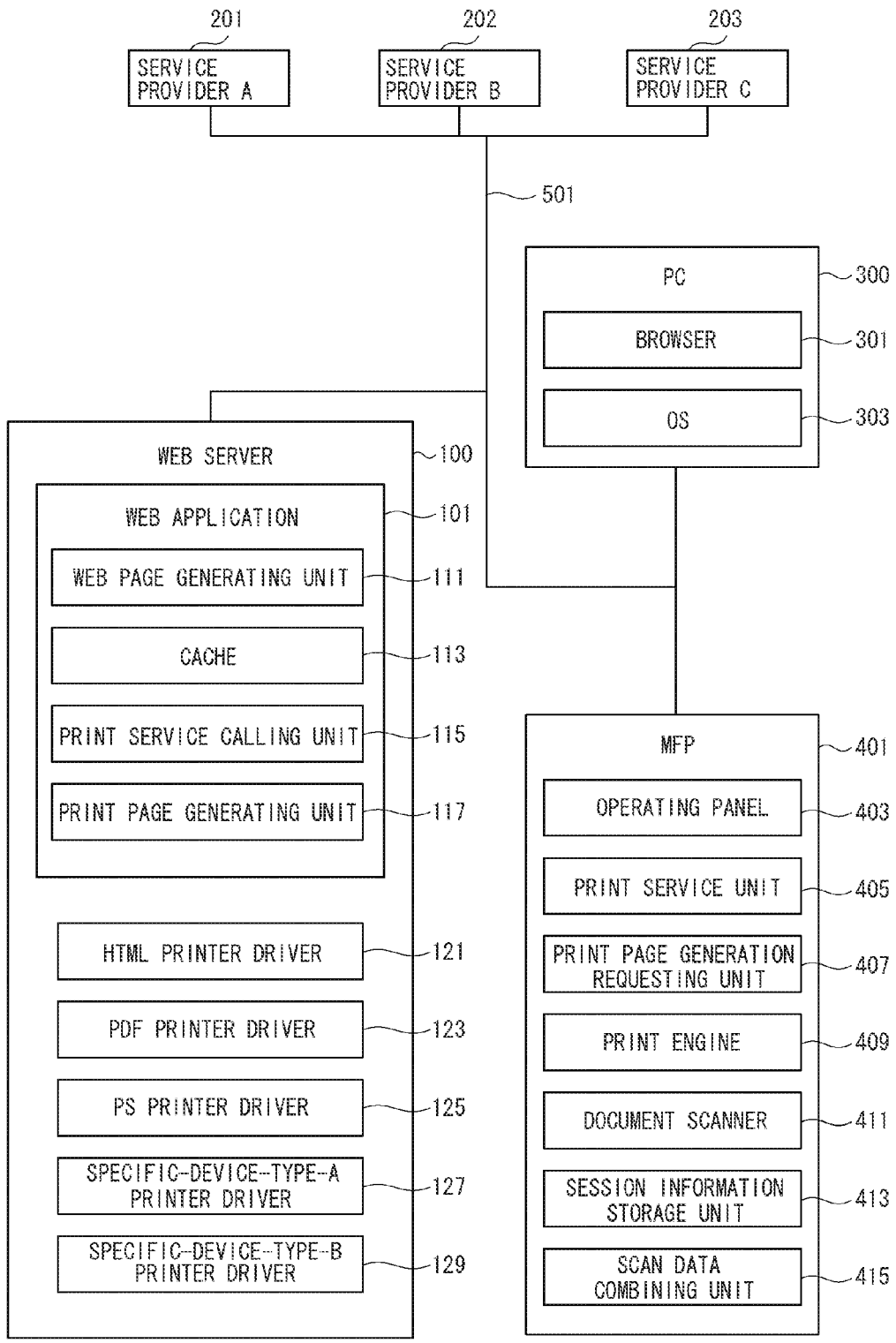
FIG. 3 shows a functional block diagram of an equipment configuration implementing a printing method according to an embodiment of the present invention.

FIG. 3 shows a functional block diagram of an equipment configuration implementing a printing method according to an embodiment of the present invention, a web server 100, an MFP 401 (image forming apparatus), and their related devices. Hereinafter, each functional block will be described according to the functional block diagram.

A service provider A 201, a service provider B 202, and a service provider C 203 provide a variety of information as web contents through a network 501. In the first embodiment, these service providers provide the following items of information, respectively. The service provider A 201 is a service provider for providing restaurant reservation information. The service provider B 202 is a service provider for providing discount coupon information. The service provider C 203 is a service provider for providing map information.

A service provider for executing a mashup service has a web server 100. The web server 100 responds to an information request made by a user via a network 501 from a browser 301.

The web server 100 requests and acquires contents which correspond to required information from the service providers A 201, B 202 and C 203, in response to a user information request transmitted from a PC (Personal Computer) 300 acting as a client terminal.

The web server 100 generates a web page according to mashup contents obtained by integrating the acquired contents with each other, and returns the generated web page to the PC 300 via the network 501. The PC 300 displays the web page received from the web server 100, on a screen of the browser 301.

Figure 1:
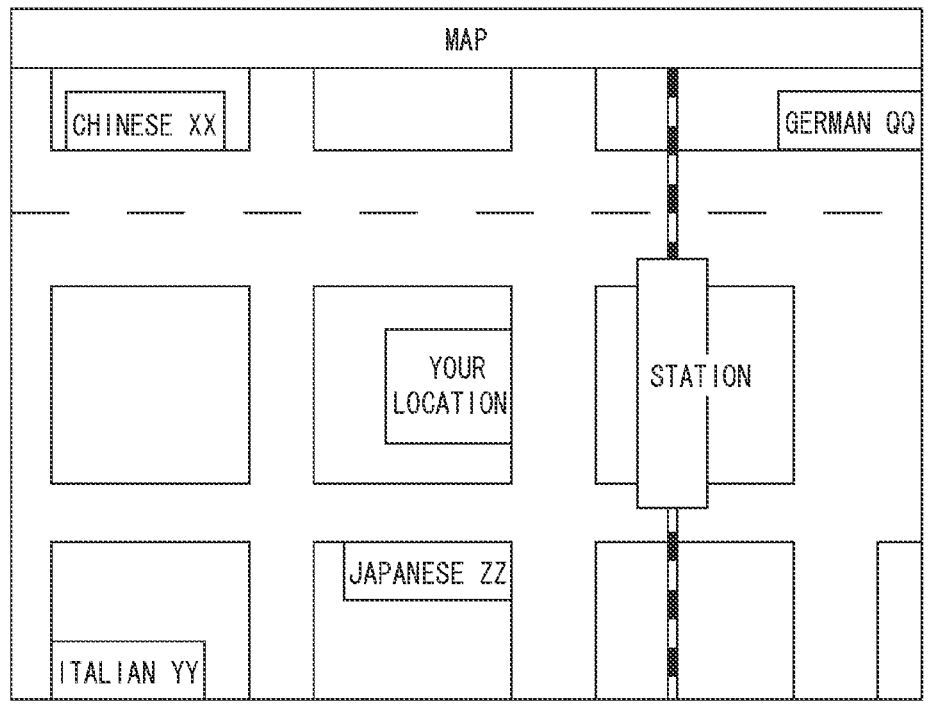
FIG. 1 shows a display example on a browser screen according to a web page with mashup contents.
Figure 2:
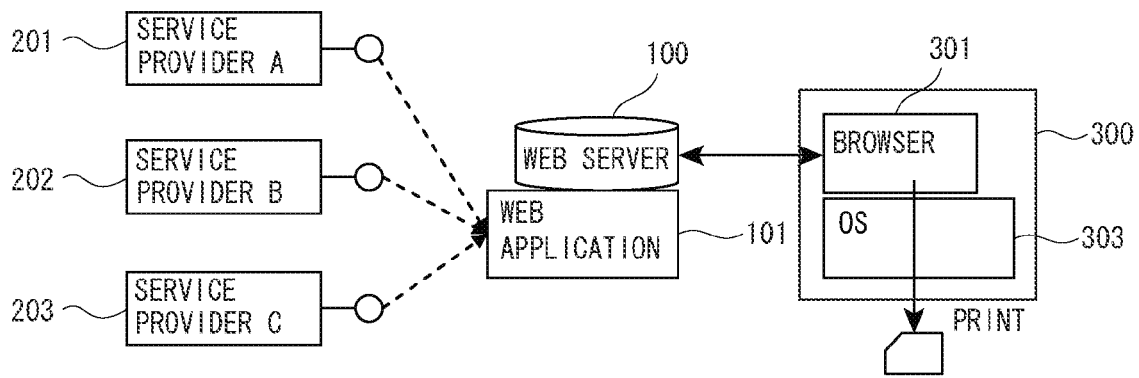
FIG. 2 shows the transfer of information in a typical mashup service.

An example of the mashup service will be described referring to FIGS. 1 and 2. FIG. 1 shows an example of a browser screen upon accessing a mashup service site for restaurant reservation.

When a user specifies items such as "date and time", "number of persons", "budget", and "location (to be designated on a map)", if there are restaurants meeting that condition and discount coupons at these restaurants, the items of information are listed, and locations of the restaurants are designated on a map.

Transfer of information in the mashup service will be described referring to FIG. 2.

First, a user accesses the web server 100 providing the mashup service from the browser 301 of the PC 300. Next, when a user inputs conditions (date and time, number of persons, budget, and location in the example of FIG. 1) in an HTML style form, and presses an information acquisition button, the PC 300 transmits these items of information as an information request to the web server 100.

The web server 100 executes a web application 101 of a mashup service site, accesses a plurality of service providers (the service provider A 201, the service provider B 202, and the service provider C 203), based upon information on the aforementioned conditions, and acquires required contents. The mashup service per se does not have restaurant information, discount coupon information, or map information.

The web server 100 acquires contents of these items of information via the network 501 from a plurality of service providers (for example, the service provider A 201 for providing restaurant reservation information; the service provider B 202 for providing discount coupon information; and the service provider C 203 for providing map information). The web server 100 integrates the acquired contents with each other, generates a web page of the mashup contents, and transmits the generated web page to the PC 300. The PC 300 acquires the web page transmitted from the web server 100, and displays the transmitted web page on the browser 301.

In addition, the web server 100 generates a print page based on a predetermined print format, in response to a user print request transmitted from the PC 300. The web server 100 transmits the generated print page to the MFP 401 (image forming apparatus), and MFP 401 prints the generated print page. Details of generating a print page will be described later.

Further, the web server 100 has a web application 101 and a variety of printer drivers 121 to 129 for printing. Details of these printer drivers will be described later in their related section.

Figure 7:
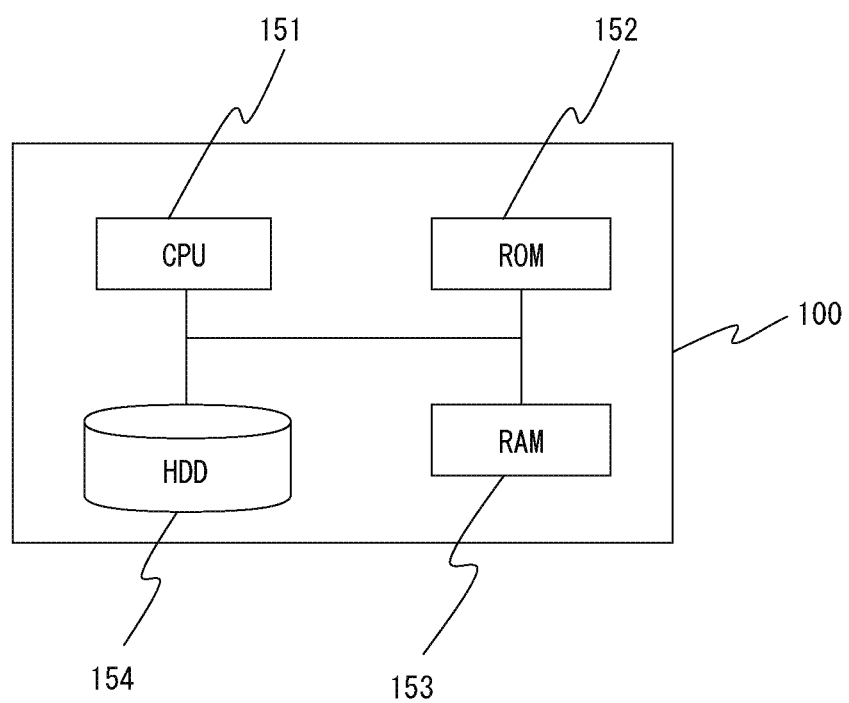
FIG. 7 shows a hardware architecture of a web server 100.

FIG. 7 shows a hardware architecture of the web server 100.

The web server 100 has a CPU (Central Processing Unit) 151, a ROM (Read Only Memory) 152, a RAM (Random Access Memory) 153 and an HDD (Hard Disk Drive) 154.

The CPU 151 is a processor for executing the web application 101 and the described processes that use printer drivers 121 to 129, etc.

The ROM 152 is a nonvolatile memory for pre-storing programs and data.

The RAM 153 is a memory employed as a work area, for temporarily storing programs and data upon executing the programs.

The HDD 154 stores a web page created by a web page generating unit 111 to be described later, a print page created by a print page generating unit 117, and contents or the like acquired from a service provider. Instead of the HDD 154, a storage device such as a readable/writable nonvolatile semiconductor memory or an optical disk drive may be used.

The web application 101 is a program for implementing a web service. The web server 100 functions as each of the several functional units, such as the web page generating unit 111, a print service calling unit 115, and a print page generating unit 117, by executing the web application 101. The web server 100 forms a storage area of a cache 113 in the HDD 154 by executing the web application 101.

Each of these functional units, and the cache 113, will be described below.

The web page generating unit 111 analyzes an information request from the PC 300, and determines which one of the information requests is to be transmitted to which one of the service providers. The web page generating unit 111 then transmits the information request to the service providers pertinent to this determination. When contents according to the information request are transmitted from these service providers, this generating unit then acquires the transmitted contents. The web page generating unit 111 generates a web page on which the acquired contents from the plurality of service providers are integrated with each other. The generated web page, as described previously, is passed to the web server 151, and is then transmitted to the PC 300.

The web page generated by the web page generating unit 111 is generally described in a markup language, and it is preferable that the page be described in HTML, XML, or XPS, in particular.

The cache 113 stores the web page generated by the web page generating unit 111. The web page generated as a result of a user having made an information request is stored in the cache 113. The web page accumulated in the cache 113 is returned to the PC 300 or the MFP 401 without making an information request to the service providers again by an information request from the PC 300 or an information request from the MFP 401. However, cache information may be incorrect due to a time lag between a time of the information request from the PC 300 and a time of the information request made from a user or a printer again. But even if data is present in the cache 113, the web page generating unit 111 can read web pages directly from the service providers. It is presupposed to be selectable as to whether the web page generating unit 111 acquires the web pages stored in the cache or newly acquires information from the service providers.

In addition, the cache 113 stores contents that the web page generating unit 111 has acquired from the service providers.

A print service calling unit 115 activates a print service unit 405 in the MFP 401 upon a print request from the PC 300. Specifically, when the print service calling unit 115 calls a print service of the MFP 401, the print service unit 405 of the MFP 401 is activated.

A print page generating unit 117 generates a print page for printing and transmits the generated print page to the MFP 401, in response to a print page generation request from a print page generation requesting unit 407 of the MFP 401. In detail, the print page generating unit 117 analyzes the print request transmitted from the PC 300, in advance of generating a print page, in response to the print page generation request. The print page generating unit 117 reads out contents which correspond to the print request from the cache 113, based upon a result of the analysis. Further, the print page generating unit 117 integrates the read out contents with each other, shapes the integrated contents in a printing form, and generates a print page. At this time, the print page generating unit 117 utilizes a printer driver to be described later, to thereby generate a print page of a format suitable for that printer driver. The paraphrase "shaping in a printing form" designates enlargement/reduction of image object(s) or frame(s), page break settings, or additions of page number, etc.

If contents to be acquired have already been erased from the cache 113, the print page generating unit 117 transmits an information request to a service provider serving as a transmission source of the contents. Afterwards, if contents responsive to the information request from the service provider are transmitted, this generating unit acquires the transmitted contents, and generates a print page as described above.

Next, each of the printer drivers will be described. As described above, the print page generating unit 117 generates a print page in response to a print page generation request from the MFP 401. At this time, the print page generating unit 117 selects an optimal printer driver, based upon equipment information or print condition information transmitted from the MFP 401. The printer drivers include an HTML printer driver 121, a PDF printer driver 123, a PS printer driver 125, a specific-device-type-A printer driver 127, and a specific-device-type-B printer driver 129. Here, the HTML printer driver 121, the PDF printer driver 123, and the PS printer driver 125 are general-purpose printer drivers, which are not dependent upon a printer device type, according to a type of page to be generated. The specific-device-type-A printer driver 127 and the specific-device-type-B printer driver 129 are printer drivers for a specific printer type. Each of these printer drivers is called by the print page generating unit 117, and is executed by the CPU 151.

The HTML printer driver 121 generates a print page in HTML (Hypertext Markup Language). In a case where this driver is selected, it is presupposed that a printer has a web page printing function. The HTML printer driver 121 not only merely outputs a browser screen as is, but also generates a web page such that a map does not break off of a certain page, for example, based upon a print condition such as a paper size.

The PDF printer driver 123 generates a print page in the PDF (Portable Document Format) style. In a case where this driver is selected, it is presupposed that the printer has a PDF document printing function.

The PS printer driver 125 generates a print page in the PS (POSTSCRIPT®) style. In a case where this driver is selected, it is presupposed that a printer has a PS printing function.

The specific-device-type-A printer driver 127 is a printer driver dependent upon a specific device type A. For example, it is possible to specify a printer in which printing is performed in an environment in which a mashup service system is used as an in-house system or the like. Therefore, with respect to a printer employed in-house, a printer driver for that device type is provided for the web server 100. Apart from such an in-house system, the mashup service system may be used in such a way that a printer driver of a popular printer driver frequently used, for example, is provided.

The specific-device-type-B printer driver 129 is a printer driver dependent upon a specific device type B, and is provided for a reason similar to that described above.

The PC (Personal Computer) 300, which may act as the client terminal, is a user-available device. The PC 300 has a browser 301 for accessing a mashup service site (web server 100), and an OS (Operating System) 303 managing operation of the PC 300.

The MFP (Multi Functional Peripheral) 401 is an image forming apparatus that builds in a copy function, a print function, a scan function, a facsimile function or the like.

In a typical printing method, a screen displayed on a PC browser has been printed via a printer driver provided in the PC, by employing a printing function of the PC browser. The MFP 401 of the embodiment transmits a print page generation request to the web server 100, in response to a call for a print service from the web server 100. Further, the MFP 401 acquires and prints a print page generated by the web server 100.

Figure 8:
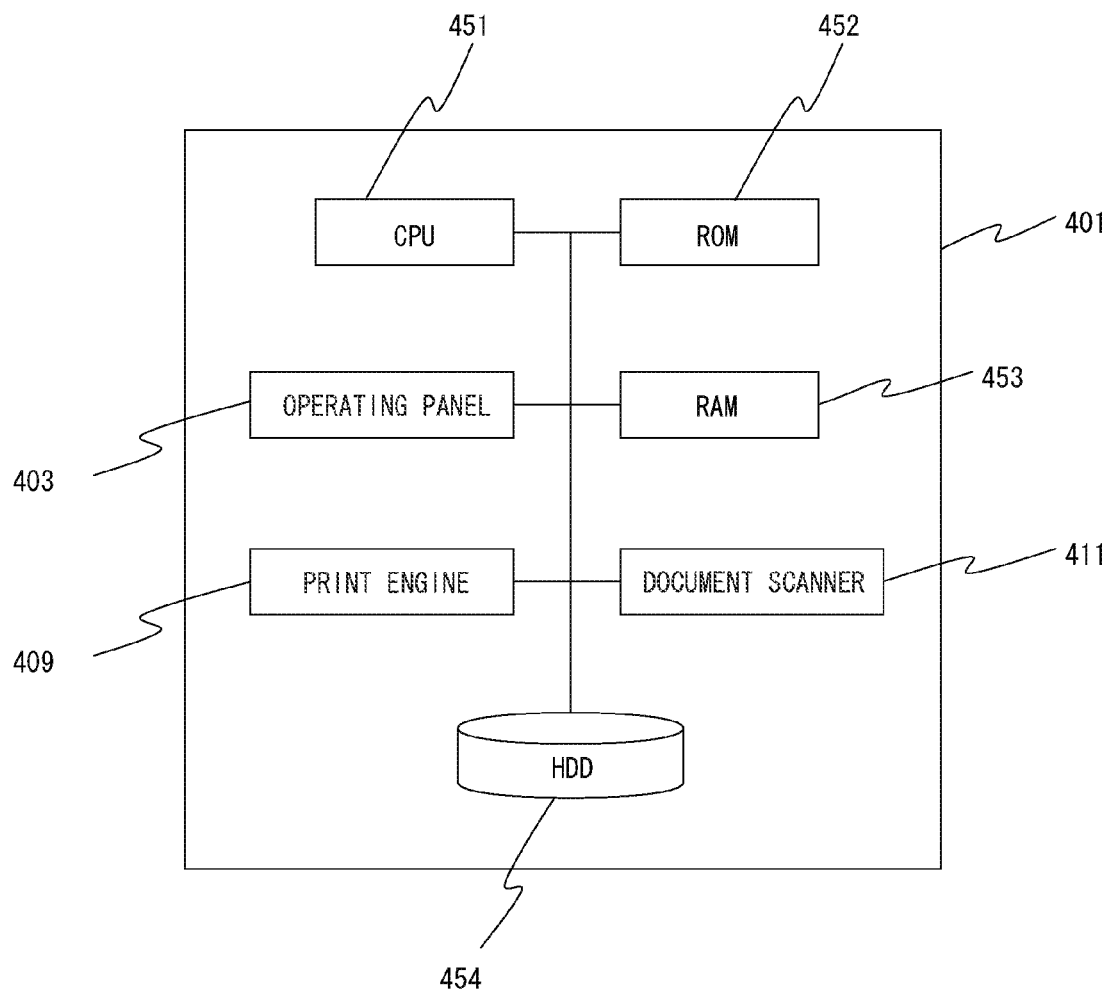
FIG. 8 shows a hardware architecture of an MFP 401.

FIG. 8 shows a hardware architecture of the MFP 401.

The MFP 401 has a CPU (Central Processing Unit) 451, a ROM (Read Only Memory) 452, a RAM (Random Access Memory) 453, an HDD (Hard Disk Drive) 454, an operating panel 403, a print engine 409 and a document scanner 411.

The HDD 454 stores session information, etc., acquired by a session information storage unit 413 to be described later. Instead of the HDD 454, a storage device such as a readable/writable nonvolatile semiconductor memory or an optical disk drive may be used.

The operating panel 403 is a panel unit having a display device and an input device for performing a variety of operations on the MFP 401. The display device displays a state of the MFP 401 or information for operational instructions. A user operates the MFP 401 by means of an input to the input device.

The print engine 409 performs a printing process. In the embodiment of the present invention, this engine prints on a sheet of paper a print page passed from the print service unit 405 to be described later.

The document scanner 411 is a functional unit for scanning an image of a hardcopy manuscript and converting the scanned image to electronic data.

The CPU 451 is a processor that executes a process of an operating program of the MFP 401.

The ROM 452 is a nonvolatile memory for pre-storing the operating program and data.

The RAM 453 is a memory employed as a work area, for temporarily storing the operating program and data upon executing the program.

The MFP 401 functions as each of the several functional units, such as the print service unit 405, the print page generation requesting unit 407, a session information storage unit 413, and a scan data combining unit 415, by executing the operating program.

The print service unit 405 is activated by an input from an external device, and provides a print service. Specifically, the print service unit 405 is activated in response to a print service call from a print service calling unit 115 of the web server 100. The activated print service unit 405 instructs the print page generation requesting unit 407 to transmit a request for generating a print page. Further, the print service unit 405 acquires the print page generated by the print page generating unit 117.

The print page generation requesting unit 407 transmits a print page generation request to the print page generating unit 117 of the web application 101 of the mashup service, in response to an instruction from the print service unit 405.

The session information storage unit 413 stores, in the HDD 454, session information required to generate a print page transmitted simultaneously with a print service call from the print service calling unit 115. For example, the session information storage unit 413 may store, as the session information, a URL obtained upon accessing the web server 100 and a parameter value following the URL, or may store print page attribute information. By storing these items of information, once a print page generation request has occurred, it becomes possible to store attribute information of the page, to display a screen on the operating panel 403 again without employing a PC, or to request print page generation. A detailed description will be given in a second embodiment.

The scan data combining unit 415 combines image data scanned by the document scanner 411 with print data. The scan data combining unit 415 passes the combined print data to the print service unit 405. The scan data combining unit 415 has an OCR (Optical Character Recognition) function. For example, the scan data combining unit 415 can combine scan data with data of a mashup service site by reading a receipt. In this manner, this combining unit can generate liquidation result data of the restaurant reservation in FIG. 1, for example, or alternatively, can combine a result of data combining with the mashup site concerning traffic conditions or accommodation reservations for business trip, with its related transport expense settlement. A detailed description will be given in a third embodiment.

Figure 4:
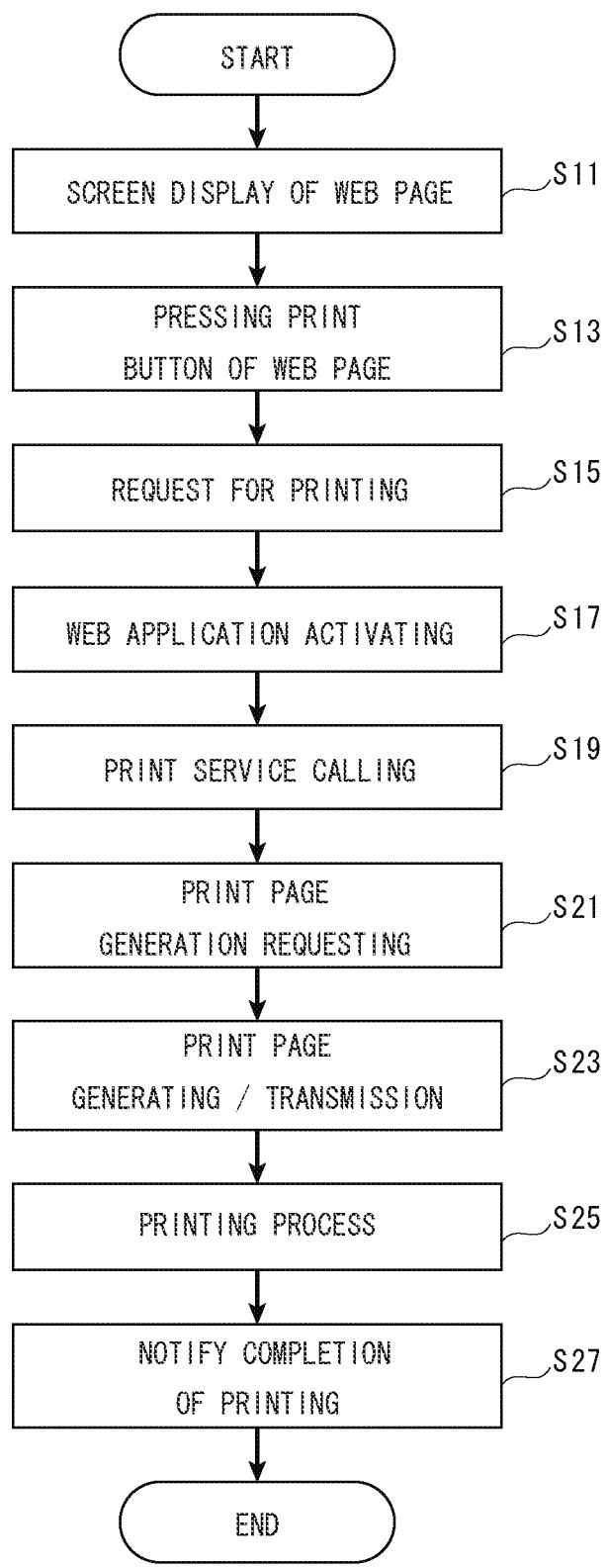
FIG. 4 shows a flowchart for a printing process according to an embodiment of the present invention.
Figure 5:
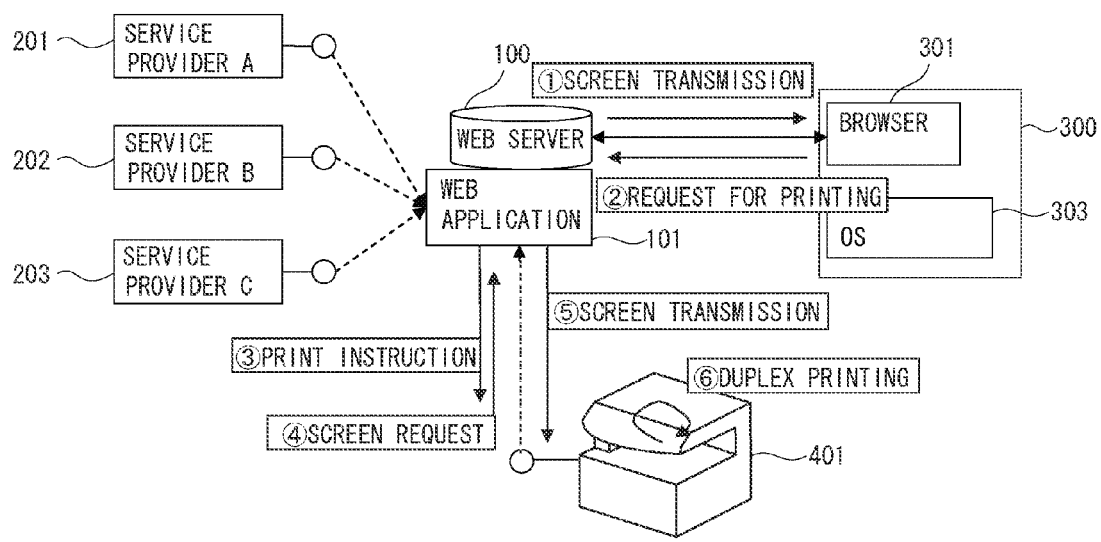
FIG. 5 shows the transfer of information in a mashup service employing a web server according to an embodiment of the present invention.

FIG. 4 shows a flowchart for printing processes by the web server 100 and the MFP 401 according to the embodiment of the present invention. FIG. 5 shows transfer of information at the time of operation of the printing processes depicted in the flowchart, in a superimposed manner on a functional block diagram of the entire system.

In the first embodiment, there is provided a unit for calling a print service of the MFP 401 on the screen (FIG. 1) of a web page transmitted from the web page generating unit 111 and displayed on a browser, for example, a "print" button as shown in FIG. 1. When a user depresses the print button on the web page displayed on a browser 301, a PC 301 transmits a print request to the web server 100. The web server 100 calls a print service of the MFP 401 in response to this print request. In this manner, upon the printing process, the web server 100 and the MFP 401 are cooperatively linked with each other in response to the print request from the PC 301.

Specifically, processing is performed as follows.

S11: The PC 300 accesses the web server 100 for providing a mashup service in response to a user instruction, and displays a web page on the browser 301.

S13: When a user depresses a "print" button on the web page displayed at S11, the PC 300 detects a user print instruction via the browser 301. The print button is part of an HTML form or the like.

S15: When depressing the print button is detected at S13, the PC 300 employs the browser 301 to transmit a print request and current session information to the web server 100 by a POST command.

S17: The web server 100 acquires the transmitted print request and session information, and activates the web application 111. The web server 100 passes the acquired print request and session information to the print service calling unit 115 and the print page generating unit 117.

S19: The print service calling unit 115 calls a print service to the MFP 401, requests activation of the print service unit 405, and transmits session information.

S21: The print service unit 405 of the MFP 401 is activated, in response to a call for a print service at S19, and acquires the session information transmitted from the print service calling unit 115. The print service unit 405 passes the acquired session information to the session information storage unit 413. The session information storage unit 413 stores the session information acquired by the print service unit 405 in the HDD 454. The print service unit 405 instructs the print page generation request unit 407 to transmit a print page generation request. In response to the instruction from the print service unit 405, the print page generation request unit 407 transmits a print page generation request to the print page generation unit 117 of the web server 100, based upon the session information acquired upon activation of the print service unit 405. Namely, the print service unit 405 requests generation of a page shaped to print a screen identical to what a user looks at through the PC 300.

S23: The print page generating unit 117 of the web server 100 generates a specified print page by selecting an optimal printer driver (from 121-129), in response to the print page generation request transmitted from the MFP 401. The print page generating unit 117 transmits the generated print page to the MFP 401.

S25: The print service unit 405 of the MFP 401 acquires the print page transmitted from the print page generating unit 117, and passes the acquired print page to the print engine 409. The print engine 409 prints the print page passed from the print service unit 405 on a sheet of paper. For example, when the print page is configured by HTML, the print engine 409 interprets, images, and prints the HTML data.

S27: The print service unit 405 of the MFP 401 notifies the web server 100 of the completion of printing. The web page generating unit 111 of the web server 100 rewrites the HTML of the source data on the web page displayed at the browser 301 of the PC 300, and transmits the rewritten HTML to the PC 300. In this manner, the web server 100 notifies a user of the completion of printing.

With the above-described method, the client terminal PC 300 eliminates processing required for printing, and can activate printing from a terminal having only a display capability, such as a thin client or a portable telephone, for example.

(Second Embodiment)

Figure 6:
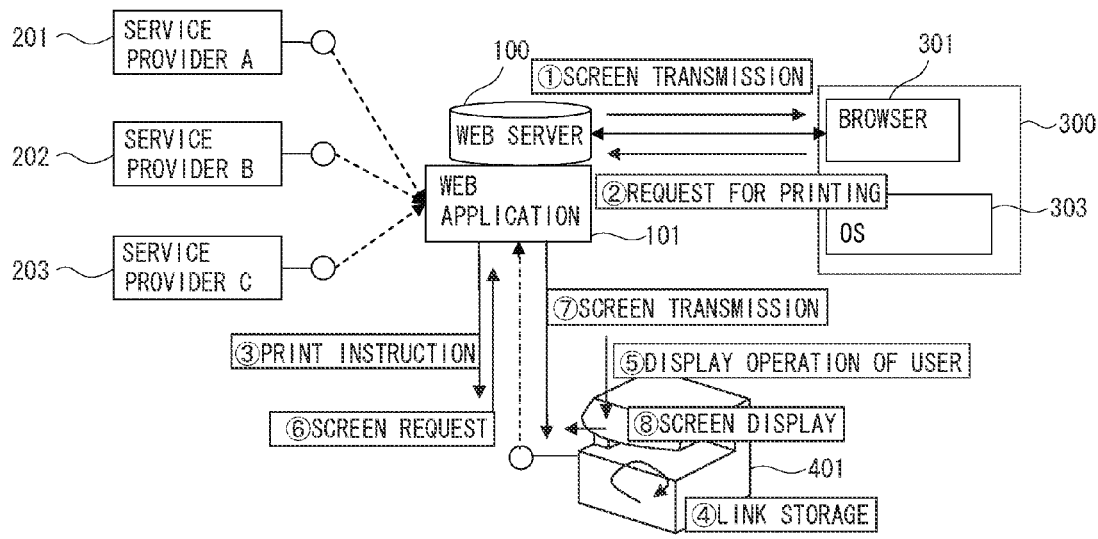
FIG. 6 shows the transfer of information in a mashup service employing a web server according to an embodiment of the present invention.

FIG. 6 shows a transfer of information in a mashup service employing a web server according to the embodiment of the present invention.

The printing process of the second embodiment is modified from the process flow of FIG. 4. The second embodiment is different from the first embodiment in that, at step S25, a process of updating a web page in the MFP is added. Specifically, the process of step S25 is as follows.

S25: The print service unit of the MFP acquires the print page transmitted from the print page generating unit, and passes the acquired print page to the operating panel. In response to the user operation on the operating panel, the display device on the operating panel displays a web page corresponding to the print page, based upon session information. The user can input a new parameter by operating the operating panel. In this manner, the MFP can transmit an information request or a print request to the web server, like the PC. In other words, a web page can be updated from that displayed on the PC at the MFP. When web page updating completes, the routine moves to step S13 at which the MFP waits for a user print instruction from the operating panel. If no web page is updated, the print service unit passes the print page transmitted from the print page generating unit 117 to the print engine. The print engine prints the print page passed from the print service unit on a sheet of paper.

(Third Embodiment)

The printing process of the third embodiment is modified from the process flow of FIG. 4. The third embodiment is different from the first embodiment in that, at step S25, a process of combining and printing scan data on a print page is added. Specifically, the process of step S25 is as follows.

S25: The print service unit of the MFP acquires the print page transmitted from the print page generating unit, and passes the acquired print page to the print engine. The document scanner scans a hardcopy manuscript, and generates electronic data. The scan data combining unit combines the data scanned by the document scanner with print data. The scan data combining unit passes the combined print data to the print service unit. The print service unit passes the print data passed from the scan data combining unit to the print engine. The print engine prints the print page passed from the print service unit on a sheet of paper.

The scan data combining unit has an OCR function. Accordingly, the scan data combining unit is capable of reading data obtained by means of a scan; preparing statement of liquidation forms; and adding a liquidation function to mashup contents for creating a business trip plan.

In part, in an embodiment, the invention may be summarized as follows.

A printing method, for a printing program executing on a web server, a client terminal and an image forming apparatus, according to an embodiment of the present invention comprises: (1) the printing program causing the web server to acquire contents from a respective one of a plurality of service providers via a network, to integrate a plurality of the acquired contents with each other to thereby generate a web page, and to transmit the generated web page to the client terminal via the network; (2) the printing program causing the client terminal to display the web page and to transmit a request for printing the web page from a browser screen to the web server; (3) the printing program causing the web server to call a print service of the image forming apparatus in response to the request for printing the web page; (4) the printing program causing the image forming apparatus to transmit to the web server a request for generating a print page corresponding to the web page by the print service; (5) the printing program causing the web server to integrate the plurality of contents with each other to thereby generate the print page, in response to the request for generating the print page from the image forming apparatus, and to transmit the generated print page to the image forming apparatus; and (6) the printing program causing the image forming apparatus to receive and to print the print page by the print service.

Accordingly, the client terminal can print a web page on which the plurality of contents is integrated with each other without imposing a burden on print page generation. Even if the client terminal is not provided with a printer driver of an image forming apparatus, the web page can be printed. For example, when a mobile PC performs a printing, even if a driver of a printer is not present on the mobile PC, the web page can be printed.

In addition, an advanced printing function can be provided at a web application program side irrespective of a printing function of a browser of a client terminal. For example, even if a browser is compatible with only an older version than that of a scripting language forming the mashup contents, a page containing a map is never broken.

In addition to the above-mentioned configuration, the web server may generate the print page in a markup language.

Accordingly, a page of a markup language may be generated as a print page, so that a burden on print page generation of a web server is reduced.

In addition to the above-mentioned configuration, the web server may generate the print page in a Portable Document Format (PDF) style.

In addition to the above-mentioned configuration, the web server may generate the print page in a PostScript style.

In addition to the above-mentioned configuration, the web server may integrate the plurality of contents with each other to generate a print page that comprises mashup contents.

Accordingly, a print page can be generated by efficiently integrating a plurality of contents with each other.

In addition to the above-mentioned configuration, the image forming apparatus may display the web page corresponding to the print page.

Accordingly, a user can request a new print page by inputting a new parameter from an operating panel of an image forming apparatus.

In addition to the above-mentioned configuration, the image forming apparatus may scan an image and may convert the scanned image into electronic data, and generate new print data by combining the print data and the electronic data received from the web server.

Accordingly, data of a print page generated by a web server and scanned image data can be combined and printed.

In addition to the above-mentioned configuration, the web server may acquire contents in response to a user information request transmitted from a client terminal.

In addition to the above-mentioned configuration, the client terminal may be a personal computer.

An image forming apparatus according to an embodiment of the present invention comprises a print service unit, a print page generation requesting unit and a printing device. The print service unit is configured to execute a print service in response to a call from the web server. The print page generation requesting unit is configured to transmit a request for generating a print page of a web page to the web server, in response to an instruction from the print service unit. The printing device is configured to receive and to print from the web server the print page generated by the web server in response to the request for generating the print page from the print page generation requesting unit.

Accordingly, the client terminal can print a web page on which the plurality of contents is integrated with each other without imposing a burden on print page generation. Even if the client terminal is not provided with a printer driver of an image forming apparatus, the web page can be printed.

In addition to the above-mentioned configuration, the image forming apparatus may comprise a session information storage unit configured to store session information obtained from the web server. Here, the print page generation requesting unit may transmit the request for generating the print page to the web server, based upon the session information that the session information storage unit stores.

Accordingly, a print page generation request can be performed merely by storing data of a small data size, referred to as session information, thus allowing the data to be handled as if page storing were performed without largely consuming memory resources of an image forming apparatus.

In addition to the above-mentioned configuration, the image forming apparatus may comprise a display device configured to display the web page corresponding to the print page, based upon the session information stored by the session information storage unit.

Accordingly, a user can request a new print page by inputting a new parameter from an operating panel of an image forming apparatus.

In addition to the above-mentioned configuration, the image forming apparatus may comprise a scanner device and a scan data combining unit. The scanner device may be configured to scan an image and to convert the scanned image into electronic data. The scan data combining unit may be configured to combine the print page with the electronic data converted by the scanner device to thereby generate new print data.

Accordingly, data of a print page generated by a web server and scanned image data can be combined and printed.

A web server according to an embodiment of the present invention comprises a web page generating unit, a print service calling unit and a print page generating unit. The web page generating unit is configured to acquire contents from a respective one of a plurality of service providers via a network, to integrate a plurality of the acquired contents to thereby generate a web page; and to transmit the generated web page to a client terminal via the network. The print service calling unit is configured to call a print service of the image forming apparatus in response to a print request of the web page from the client terminal. The print page generating unit is configured to integrate the plurality of contents with each other to thereby generate the print page, in response to the request for generating the print page from the image forming apparatus; and to transmit the generated print page to the image forming apparatus.

Accordingly, the client terminal can print a web page on which the plurality of contents is integrated with each other without imposing a burden on print page generation. Even if the client terminal is not provided with a printer driver of an image forming apparatus, the web page can be printed.

In addition to the above-mentioned configuration, the print page generating unit may generate the print page in a markup language.

Accordingly, a page of a markup language may be generated as a print page, so that a burden on print page generation of a web server is reduced.

In addition to the above-mentioned configuration, the print page generating unit may generate the print page in a Portable Document Format (PDF) style.

In addition to the above-mentioned configuration, the print page generating unit may generate the print page in a PostScript style.

In addition to the above-mentioned configuration, the print page generating unit may integrate the plurality of contents with each other to thereby generate a print page that comprises mashup contents.

Accordingly, a print page can be generated by efficiently integrating a plurality of contents with each other.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A printing method comprising:
a web server acquiring contents from a respective one of a plurality of service providers via a network, integrating a plurality of the acquired contents with each other to thereby generate a web page, and transmitting the generated web page to a client terminal via the network, wherein the web server includes a cache and a plurality of printer drivers;
the cache storing the contents that the web server has acquired from the service providers;
the client terminal displaying the web page and transmitting from a browser screen to the web server: (a) a request for printing the web page and (b) session information;
the web server acquiring the request for printing the web page and the session information;
the web server calling a print service of an image forming apparatus in response to the request for printing the web page, wherein the web server calling the print service of the image forming apparatus further comprises the web server transmitting the session information to the image forming apparatus;
the image forming apparatus executing the request for printing the web page in response to the web server calling the print service of the image forming apparatus;
the image forming apparatus storing the session information transmitted from the web server;
based upon the session information that the image forming apparatus stores, the image forming apparatus transmitting to the web server a request for generating a print page corresponding to the web page by the print service;
the web server selecting a specific printer driver from the plurality of printer drivers and reading out the contents that correspond to the print request from the cache to integrate the plurality of read out contents with each other to thereby generate the print page utilizing the specific printer driver, in response to the request for generating the print page from the image forming apparatus, and transmitting the generated print page to the image forming apparatus; and
the image forming apparatus receiving and printing the print page by the print service,
wherein the web server, when generating the print page, acquires the contents from the service providers if the contents to be acquired have been erased from the cache.

2. The printing method of claim 1, wherein:
the web server generates the print page in a markup language.

3. The printing method of claim 1, wherein:
the web server generates the print page in a Portable Document Format (PDF) style.

4. The printing method of claim 1, wherein:
the web server generates the print page in a PostScript style.

5. The printing method of claim 1, wherein:
the web server integrates the plurality of contents with each other to generate a print page that comprises mashup contents.

6. The printing method of claim 1, wherein:
the image forming apparatus displays the web page corresponding to the print page.

7. The printing method of claim 1, wherein:
the image forming apparatus scans an image and converts the scanned image into electronic data, and generates new print data by combining the print data and the electronic data received from the web server.

8. The printing method of claim 1, wherein:
the web server acquires contents in response to a user information request transmitted from the client terminal.

9. The printing method of claim 8, wherein:
the client terminal is a personal computer.

10. The printing method of claim 1, wherein:
the image forming apparatus displays the web page corresponding to the print page, based upon the session information stored by a session information storage unit.

* * * * *